Aug. 22, 1961  R. J. SMITH  2,996,916
MEANS OF CONNECTING THERMOCOUPLES TO OBTAIN
TRUE ARITHMETICAL AVERAGE
Filed May 3, 1955

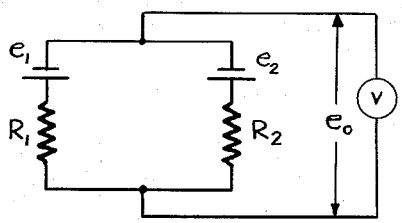

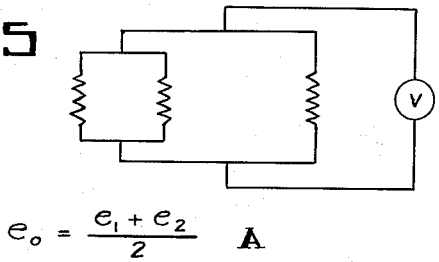

$$e_o = \frac{e_1 + e_2}{2} \quad \mathbf{A}$$

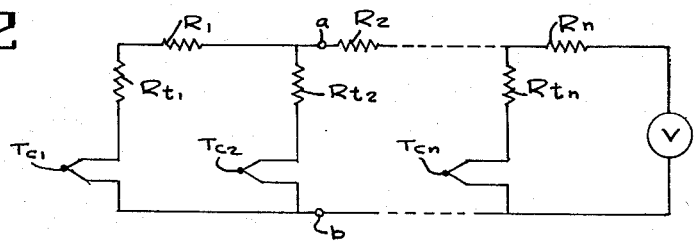

$$\frac{Re_o(\text{LEFT})}{Re_o(\text{RIGHT})} = \frac{\text{No. OF TCS. TO THE RIGHT}}{\text{No. OF TCS. TO THE LEFT}} \quad \mathbf{D}$$

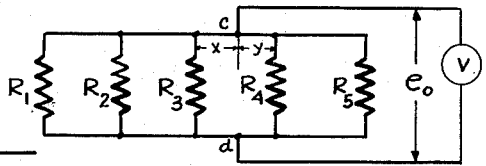

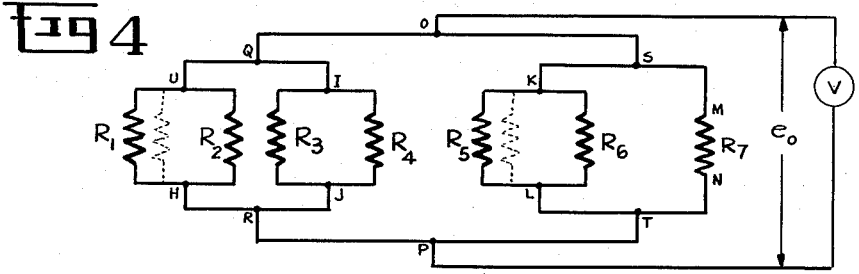

$$\frac{R_{OQP}}{R_{OSP}} = \frac{\text{No. OF TCS. IN BRANCH OSP}}{\text{No. OF TCS. IN BRANCH OQP}}$$

$$\frac{R_{QUR}}{R_{QIR}} = \frac{\text{No. OF TCS. IN BRANCH QIR}}{\text{No. OF TCS. IN BRANCH QUR}}$$

$$\frac{R_{SKT}}{R_{SMT}} = \frac{\text{No. OF TCS. IN BRANCH SMT}}{\text{No. OF TCS. IN BRANCH SKT}}$$

INVENTOR.
RICHARD J. SMITH
BY
Edward M. Title
HIS ATTORNEY

United States Patent Office 2,996,916
Patented Aug. 22, 1961

1

2,996,916
MEANS OF CONNECTING THERMOCOUPLES TO OBTAIN TRUE ARITHMETICAL AVERAGE
Richard J. Smith, Cincinnati, Ohio, assignor to General Electric Company, a corporation of New York
Filed May 3, 1955, Ser. No. 505,609
4 Claims. (Cl. 73—341)

The present invention relates to a means for determining the true arithmetical average of a plurality of voltage generating sources connected in parallel. More particularly for illustration, it relates to a means of connecting a plurality of thermocouples in parallel so that the true arithmetical average of the individual thermocouples may be obtained.

While the present invention arose from the need for determining the average exhaust gas temperature in jet engines, it has many applications and the jet engine application mentioned herein is for illustration only, of the use of thermocouples as a voltage generating source, thermocouples also having use in pyrometers and other applications where temperatures are to be measured.

Normally, the exhaust gas temperature is determined by a plurality of thermocouples connected in parallel and inserted in the exhaust gas stream of a jet engine. The output voltage is then used to obtain information concerning the engine.

Thermocouples connected in parallel have been averaged heretofore to obtain a mean or average temperature indication. However, all prior art with which applicant is familiar has disclosed systems which merely approach the true average but have never reached it.

Accordingly, the main object of the present invention is to provide means for measuring the temperature at various locations of a variably heated medium, averaging the result and producing a voltage output which is a true arithmetical average of the temeprature at the various locations throughout the variable being measured.

Another object is to provide a means for obtaining the true arithmetical average temperature of a gas or body by observing certain fixed relations in the connecting of a plurality of thermocouples in parallel.

Briefly stated, the present invention includes a means of connecting voltage generating means such as thermocouples in parallel wherein the output voltage of the harness or paralleled thermocouples can be made to equal the arithmetical average of all the thermocouples or, in other words, there is obtained a true average temperature of the thermocouples. In order to obtain the true average temperature, the value of the thermocouples and their connection in the harness is determined in accordance with certain criteria which will become apparent hereinafter. It is to be understood that while thermocouples are preferred and are used for purposes of discussion herein, any voltage generating means is adaptable to the present invention and thermocouples are, in that respect, illustrative only.

My invention will be better understood from the following description taken in connection with the accompanying drawing, and its scope will be pointed out in the appended claims. In the drawing:

FIGURE 1 is a schematic drawing of two circuit equivalents of thermocouples connected in parallel;

FIGURE 2 is a schematic drawing of a circuit equivalent of a thermocouple ladder similar to FIGURE 1 showing the application of the first condition thereto;

FIGURE 3 is a schematic drawing of a circuit equivalent of a thermocouple ladder and showing the application of the second condition thereto;

FIGURE 4 is a schematic drawing of a more complicated circuit equivalent of a thermocouple ladder and showing the application of the first and second conditions thereto. A modified form is shown in dotted lines in FIGURE 4 and;

FIGURE 5 is a block diagram illustrating the connection for a group to a branch.

Referring first to FIGURE 1, there is shown, for illustration, the circuit equivalent of a pair of thermocouples connected in parallel by wires of no resistance. If R is the resistance and $e$ is the voltage of the thermocouple and 1 and 2 refer to the different thermocouples, then by Kirchoff's laws it follows that the average output voltage $e_o$ of these two thermocouples as measured by volt meter V is equal to one-half the sum of the individual voltages where the resistance of each thermocouple is equal. This is shown by Equation A of FIGURE 1. The output voltage is then the true average. This is a well-known relation and is given merely as background for the present invention.

The above example of FIGURE 1 is, of course, ideal in that wires of no resistance are used. The relation also holds true where the wires have resistance if the tap-off terminals are made at the mid-point of the resistance of the wires connecting the two resistances $R_1$ plus $R_2$. In such case, the resistance of the wires is effectively zero since they are balanced.

By the method applicant now discloses, it makes no difference whether the resistances of the wires are the same or not, or where the tap-off is made.

For purposes of discussion herein, the harness refers to the thermocouples as connected in parallel no matter how complicated the arrangement may become. Because a set of thermocouples connected in parallel to a pair of common conductors diagrammatically resembles a ladder, the term ladder-type thermocouple harness is used.

In FIGURE 2, there is shown a plurality of thermocouples connected in parallel similar to that of FIGURE 1, but in this case the connecting wires are given some resistance $R_2$ and so on up to $R_n$. The resistance of the first thermocouple is called $Rt_1$, that of the second, $Rt_2$, and so on up to $Rt_n$. It is desired that this circuit be set up so that the output voltage represents a true arithmetical average of the voltages generated by the thermocouples $R_1, R_2 \ldots R_n$. From here on, it is necessary only to talk about resistances and not voltages since it can be shown, through the use of Kirchoff's laws, that the maintenance of the criteria hereinafter described will result in the desired output voltage and any voltage generating source that has a resistance will operate according to the invention.

Having selected $Rt_1$ and $R_1$ (which may be measured), it is now necessary to select unknown $Rt_2$ so that when connected, the true average will be obtained. To obtain this relation, the equivalent resistance $Re$ is calculated. It may be defined as the resistance of the network including the unknown thermocouple looking back into the network from the unknown thermocouple. As illustrated in FIGURE 2, if points $a$ and $b$ are the reference points then the equivalent resistance of the network is:

$$Re_2 = \frac{(Rt_1 + R_1)Rt_2}{Rt_1 + R_1 + Rt_2} \quad (B)$$

which is merely the calculation of the equivalent resistance of a circuit comprising two series resistances $Rt_1$ and $R_1$ which are in parallel with an unknown resistance $Rt_2$ as shown by Equation B.

Applicant now proposes a primary condition to be met in the solution for $Rt_2$ and this is given by the Equation C of FIGURE 2, which states that the equivalent resistance must equal the resistance of the unknown thermocouple resistor divided by the numerical ladder position of the unknown thermocouple resistor or, in other words, in the illustration given wherein we are seeking $Rt_2$, the $Re_2$ must equal $Rt_2$ divided by two or $Rt_2$ equals two times $Re_2$. If there are to be seven resistances connected in parallel to form the ladder, then the equivalent resistance of the seven parallel resistances shall equal the resistance of the seventh resistor divided by seven, or the seventh and unknown resistor equals seven times the equivalent resistance including the seventh resistor and so on for each resistor being determined.

Thus, with the use of Equation B which is conventional, it is possible to solve for $Re_2$ in terms of $Rt_2$, and with the use of Equation C which is applicant's imposed limitation, the value of the unknown $Rt_2$ may be obtained and substituted in the ladder.

If Equation C is complied with in solving for the unknown $Rt_2$ or $Rt_n$ resistance, depending on what ladder resistance is sought, then when $Rt_n$ as found is substituted in the ladder in parallel with the preceding resistances, the resultant voltage, as measured by volt meter V or a suitable means which determines the output as a function of the voltage, at the end of the ladder, will be the true arithmetical average of the individual voltages and this relation holds regardless of whether the individual resistances are equal or unequal and whether the resistances of the connecting wires are equal or unequal or whether the spacing between resistances is equal or unequal.

It can be shown that where the spacing of the thermocouples and the resistances of the wires connecting them are kept equal, the succeeding thermocouples in the ladder increase in an arithmetical progression. Thus, under the equal conditions in such a case, if the value of the first thermocouple is assigned, as it must be for a starting point, and the second one calculated in accordance with Equations B and C, then it is a simple matter by virtue of the arithmetical progression, to predict the value of any thermocouple in the ladder at any position in the ladder, in order to maintain the relation that gives the true arithemtical average. It can be proved that the procedure may be reversed. For example, if we know $R_3$ or $Re$ up to and including $R_3$, it is possible by use of Equation C first and then the Equations C and B, to solve for $R_1$ and $R_2$.

The above discussion applies to a group of ladder-like resistances connected in parallel where the resultant voltage is tapped-off at the end, such as in FIGURE 2. Structural limitations may dictate a more convenient tap-off at some other point in the harness or ladder. Such a configuration is shown in FIGURE 3, wherein the tap-off at points $c$ and $d$ is unequally spaced from the ends of the ladder.

In FIGURE 3, each R represents a thermocouple resistance and, as shown, there are five of them in the ladder connected in parallel with one another. Points $c$ and $d$ are arbitrarily selected for illustration as the tap-off between the third and fourth resistances. Points $c$ and $d$ are preferably selected to provide for a symmetrical relation although this is not a necessity but is merely a practical selection. In the calculation of this ladder, the value of $R_1$ is selected as a starting point as before, and then the values of $R_2$ and $R_3$ are calculated on the basis of the equivalent resistance as set forth above by using it in Equation C and solving for the unknown. Having calculated the values of these resistances up to points $c$ and $d$, then a value is selected for $R_5$ from which $R_4$ may be calculated after the equivalent resistance is found from Equation B by then using Equation C to solve for $R_4$. Having calculated these two equivalent resistances, i.e. the equivalent resistance to the left of points $c$ and $d$ and the equivalent resistance to the right of points $c$ and $d$, then a further relation must be complied with in accordance with applicant's invention, and this relation is set forth in Equation D. Equation D states that between any two terminals the resistance of the network to the left of the terminals is to the resistance of the network to the right of the terminals as the number of thermocouples to the right of the terminals is to the number of thermocouples to the left of the terminals. As shown illustratively in FIGURE 3, the number of thermocouples to the left of the terminals $c$ and $d$ is three, and the number of thermocouples to the right of the terminals is two. Thus, whatever the equivalent resistance to the left of the terminals $c$ and $d$ may be, it must be in the ratio of 2 to 3 to the equivalent resistance to the right of the terminals $c$ and $d$. If this relation is maintained, i.e. if the ladder is constructed in accordance with Equation C and the tap-off is selected in accordance with Equation D, then the voltage output $e_o$ as measured by volt meter V or a suitable equivalent will represent the true arithmetical average of the individual voltages of the thermocouples.

The arrangement in FIGURE 3 may be obtained in three ways. First, it is possible to judiciously pick a tap-off point so that the equivalent resistances will come out in the proper ratio as dictated by Equation D. Secondly, it is possible to pick a terminal point and calculate an additional resistance to be connected in series with the three resistances $R_1$–$R_3$ which are connected in parallel with each other, or connected in series with $R_4$–$R_5$ which are connected in parallel with each other and, by addition of this suitable resistance, it is possible to make the ratio as set forth in Equation D come out correctly. Thirdly, it is possible to select any arbitrary tap-off such as points $c$ and $d$ in FIGURE 3. The unknown quantities are the values of $R_4$ and $R_5$. $Re$ left, the number of resistances to the left and the right of the tap-off are known. From this, with Equation D, the value of $Re$ right can be determined. Then the value of $R_4$ can be determined from Equation C. Then Equation B may be used to determine the value of $R_5$. The same general procedure may be used no matter how many resistances are involved.

Applicant will now illustrate a numerical example applied to FIGURE 3 to illustrate the use of the limitations set forth in Equations C and D. The first means, as set forth in the preceding paragraph, will be illustrated except that, instead of finding the tap-off by judicious selection, it will be calculated. To more broadly illustrate the application of the limitations, it is assumed that the bus wires that connect the resistances in parallel have resistance. These are the horizontal wires connecting the resistances together at the top and bottom in FIGURE 3.

Having selected $R_1$ to be, for example 3, it is necessary to determine the other resistances $R_2$–$R_5$ and the tap-off points $c$ and $d$ to be taken someplace between $R_3$ and $R_4$ as shown in FIGURE 3. Assume that the bus wires have a resistance of 1.

By the use of conventional Equation B, it is possible to calculate the value of $Re_2$ up to and including the unknown $R_2$. Substituting the values of 3 and 1 and the unknown $R_2$ in Equation B and solving, it follows that $$Re_2 = \frac{4R_2}{4+R_2}$$

which, for later reference, may be called Equation G.

Knowing $Re_2$ in terms of $R_2$, the next step is to apply Equation C which, in the case at hand, is $$Re_2 = \frac{R_2}{2}$$

Equating the values of $Re_2$ from the two equations and solving for $R_2$, the value of $R_2$ turns out to be 4.

The value of 4 is now placed in the ladder at $R_2$. Next, $R_3$ must be determined. A different value of bus wire resistance between $R_2$ and $R_3$ may be assumed over that between $R_1$ and $R_2$. The different value may result from different wire size or length to illustrate that no symmetry must be maintained. Let the new value be arbitrarily selected as 2.

Now from Equation G, referred to above, by substituting the value of $R_2$ or 4 therein, then $Re_2$ turns out to be 2. The value of $Re_3$, as determined from Equation B, is $$Re_3 = \frac{(Re_2 + 2 \text{ [bus wire resistance]})R_3}{Re_2 + 2 + R_3}$$

This may be equated to $Re_3$ in Equation C and the value of $Re_2$ or 2 substituted therein and $R_3$ turns out to be 8, and by the use of this value, back in Equation C, $Re_3$ is equal to 8/3.

Thus, the ladder is solved up to the tap-off point wherein $R_1$, $R_2$ and $R_3$ are found to be 3, 4 and 8 respectively, and the bus wires are assumed to have different resistances. If the volt meter were connected at this point as shown, and the ladder ended here, the reading on the volt meter would show the true arithmetical average. However, the ladder continues, so further calculations must be made with observance of the criteria of applicant's invention.

The next step is to start from the other end of the ladder viz. at $R_5$ and work back to the tap-off point. Again, assume a value for $R_5$ and let it be 7 and let the bus wire resistance between $R_5$ and $R_4$ be still a different value, say 3. It is desired to find $R_4$. From Equation B then, $$Re_4 = \frac{(R_5 + 3 \text{ [bus wire]})R_4}{R_5 + 3 + R_4}$$

and from Equation C, $$Re_4 = \frac{R_4}{2}$$

It is to be noted here that the denominator is 2 because $R_4$ is in the second ladder position counting from the first resistance which is now $R_5$ in the network comprising $R_4$ and $R_5$ connected in parallel. Equating the two values of $Re_4$ and solving for $R_4$, it is found that $R_4$ is 10 and $Re_4$ is then 5.

Having obtained the values of the resistances in the ladder, attention must be directed to the next limitation of applicant's invention as set forth in Equation D to find out where, in the bus wires between $R_3$ and $R_4$, the tap-off must be made.

If the distance from the bus wire connection of $R_3$ and the tap-off point $c$ is called $x$ and the distance on the opposite side is called $y$, as seen in FIGURE 3, then $x+y$ will have a value which is the resistance of the bus wire between $R_3$ and $R_4$. Let this value be 2 for simplification. Then $x+y=2$ and $y=2-x$ which can be called Equation W. Now, referring to Equation D, the value of $Re$ left will be 8/3 which is the value of $Re_3$ previously determined since the equivalent resistance is desired up to tap-off point $c$. But the additional length of the bus wire also has a resistance $x$ which must be added to $Re_3$ since it is in series therewith. So $Re$ left equals 8/3 plus $x$. Similarly, $Re$ right equals 5 (which is $Re_4$) plus $y$. The number of thermocouples or resistances to the right of tap-off is 2 and to the left is 3.

Setting up Equation D with these values gives;

$$\frac{8/3 + x}{10/2 + y} = 2/3$$

and solving, by substituting the value of $y$ in terms of $x$ from Equation W above, gives $x$ equal to six-fifths or 6/5 and, back in Equation W, the value of $y$ equals four-fifths or 4/5.

Thus, the tap-off is made where the resistance is 6/5 from the connection of $R_3$ and the bus wire and 4/5 from the connection of $R_4$ and the bus wire. If the resistance of the bus wires varies linearly, the 6/5 and 4/5 may be marked off in terms of distances from their respective points.

A ladder so constructed, within the limits set by Equations C and D, then gives the true arithmetical average sought.

FIGURE 4 illustrates a further arrangement wherein the basic limitations set forth in Equation D are maintained to insure that the output voltage $e_o$ is the true arithmetical average of all of the individual resistances $R_1$–$R_7$. The equations shown for FIGURE 4 illustrate the application of Equation D thereto. While two resistances have been shown such as $R_1$ and $R_2$, and $R_3$ and $R_4$ etc. in each individual ladder for simplification, it will be appreciated that any number of resistances may be used in each individual ladder as shown by the addition of dotted resistances providing each ladder is constructed in accordance with Equation C and the tap-off selected properly as indicated by Equation D. For example, each individual ladder such as $UR_1HR_2$ or $IR_3JR_4$ which may be termed groups may comprise a plurality of resistances as shown in FIGURE 3. In such case, Equation C must be complied with in constructing each ladder or groups and then Equation D must be complied with in connecting the ladders or groups together in parallel. The connection of two groups may be said to comprise a branch such as $QR_1RR_4Q$ and two or more branches connected in parallel, a leg such as OQRPTSO and so on, as the network is built up, the parallel-connecting terminals being determined in accordance with Equation D.

In FIGURE 5, there is shown diagrammatically by blocks the arrangement wherein a group is connected in parallel with a branch. Again, the use of the limitations set forth in the equations insures the true arithmetical average being obtained as hereinbefore described.

If the ladder-type thermocouple harness is constructed in accordance with Equations B, C and D, as hereinbefore set forth, no matter how complicated the arrangement may become, the output voltage $e_o$, as measured by volt meter V or other suitable means, will always represent the true arithmetical average of the voltages of each individual thermocouple in the ladder.

While I have hereinbefore shown improved embodiments of my invention, it is to be understood that the invention is not limited to any specific construction and/or application, but might be applied in various forms applying the limitations of Equations C and/or D without departing from the spirit of the invention or the scope of the appended claims.

I claim:

1. Means for determining the true arithmetical average of the voltage output of a group of three or more voltage generating means, comprising a pair of common conductors between which said voltage generating means are connected in parallel relation to form a ladder network with one of said voltage generating means disposed in each branch thereof and with the portions of said common conductors between said branches having predetermined appreciable resistance, said ladder network having a pair of output terminals connected across the same intermediate the ends thereof with the number of voltage generating means disposed to the left of said output terminal connections differing from the number disposed to the right thereof in the ladder network, the resistance of each end branch of said ladder network being of predetermined value, and the resistance of each succeeding branch being of value:

$$Rt_n = nR_e$$

where: $Rt_n$ is the resistance of the $n$th branch where $n$ is counted from the adjacent end branch, and $Re$ is the equivalent resistance of the ladder network including that end branch and each successive branch up to and including the $n$th branch and the resistance of the portions of said common conductors which connect said branches, the equivalent resistances at the output terminals including adjacent common conductor resistance being related to the number of voltage generating means on each side of the output terminals in accordance with the formula:

$$\frac{R_{eo} \text{ left}}{R_{eo} \text{ right}} = \frac{\text{Number of voltage generating means to the right}}{\text{Number of voltage generating means to the left}}$$

where left and right are taken with reference to said output terminal connections.

2. Means for determining the true arithmetical average of temperature indications of three or more thermocouples, comprising a pair of common conductors between which said thermocouples are connected in parallel relation to form a ladder network with one of said thermocouples disposed in each branch thereof and with the portions of said common conductors between said branches having predetermined appreciable resistance, a pair of output terminals connected across said ladder network at such position intermediate the ends thereof that the two sides of said ladder network are asymmetric about said output terminal connections, the resistance of each end branch of said ladder network being of predetermined value, and the resistance of each succeeding branch being of value:

$$Rt_n = nR_e$$

where: $Rt_n$ is the resistance of the $n$th branch where $n$ is counted toward said output terminal connections from the adjacent end branch, and $R_e$ is the equivalent resistance of the ladder network including that end branch and each successive branch up to and including the $n$th branch and the resistance of the portions of said common conductors which connect said branches, the equivalent resistance of the network to each side of said output terminal connections including adjacent common conductor resistance being related to the equivalent resistance to the other side of the output terminal connections in accordance with the formula:

$$\frac{R_{eo} \text{ left}}{R_{eo} \text{ right}} = \frac{\text{Number of voltage generating means to the right}}{\text{Number of voltage generating means to the left}}$$

where left and right are taken with reference to said output terminal connections.

3. Means for determining the true arithmetical average of the voltage output of a group of four or more voltage generating means, comprising a pair of common conductors between which said voltage generating means are connected in parallel relation to form a ladder network with one of said voltage generating means disposed in each branch thereof and with the portions of said common conductors between said branches having predetermined appreciable resistance, said ladder network having a pair of output terminals connected across the same at such position intermediate the ends thereof as to place at least three of said voltage generating means to one side of said terminal connections, the resistance of the opposite end branches of said ladder network being of predetermined values, and the resistance of the other branches of said ladder network each being of value:

$$Rt_n = nR_e$$

where: $Rt_n$ is the resistance of the $n$th branch where $n$ is counted from the adjacent end branch and toward said output terminal connections, and $R_e$ is the equivalent resistance of the ladder network including that end branch and each successive branch up to and including the $n$th branch and the resistance of the portions of said common conductors which connect said branches, the equivalent resistances at said output terminal connections including adjacent common conductor resistance being related to the number of voltage generating means on each side of the output terminal connections in accordance with the formula:

$$\frac{R_{eo} \text{ left}}{R_{eo} \text{ right}} = \frac{\text{Number of voltage generating means to the right}}{\text{Number of voltage generating means to the left}}$$

where left and right are taken with reference to said output terminal connections.

4. Means for determining the true arithmetical average of temperatures comprising four or more thermocouples with junctions adapted to be exposed to said temperatures, a pair of common conductors between which said thermocouples are connected in parallel relation to form a ladder network with one of said thermocouples disposed in each branch thereof and with the portions of said common conductors between said branches having predetermined appreciable resistance, a pair of output terminals connected across said ladder network at such position intermediate the ends thereof as to place at least three of said voltage generating means to one side of said output terminal connections, the resistance of the end branch on said one side of the ladder network being of predetermined value, and the resistance of each succeeding branch being of value:

$$Rt_n = nR_e$$

where: $Rt_n$ is the resistance of the $n$th branch where $n$ is counted from said one end branch, and $R_e$ is the equivalent resistance of the ladder network including said one end branch and each successive branch up to and including the $n$th branch and the resistance of the portions of said common conductors which connect said branches, the equivalent resistance of the network to one side of said terminal connections including adjacent common conductor resistance being related to the equivalent resistance to the other side output terminal connections in accordance with the formula:

$$\frac{R_{eo} \text{ left}}{R_{eo} \text{ right}} = \frac{\text{Number of thermocouples to the right}}{\text{Number of thermocouples to the left}}$$

where left and right are taken with reference to said output terminal connections.

References Cited in the file of this patent

UNITED STATES PATENTS

| | | |
|---|---|---|
| 1,659,804 | Brown | Feb. 21, 1928 |
| 1,985,967 | Wunsch | Jan. 1, 1935 |

OTHER REFERENCES

Air Force Technical Report No. 6546, July 1951, "Use of Parallel Thermocouples in Turbojet Engines," by Dahl and Flock, published by CADO, Wright Patterson Air Force Base, Dayton, Ohio.

Article "Average Temperature by Parallel Connected Thermocouples," by B. E. Drimmer, Journal of Applied Physics, vol. 24, No. 2, February 1953.

Publication, AIEE Technical Paper 51–247, May 1951, "Hot Spot Rise Simulator."